United States Patent [19]

Itoh

[11] Patent Number: 4,568,308
[45] Date of Patent: Feb. 4, 1986

[54] TWO-SPEED ACTION SPRING DRIVE
[75] Inventor: Shunichi Itoh, Souka, Japan
[73] Assignee: Nikken Industries Corp., Tokyo, Japan
[21] Appl. No.: 558,914
[22] Filed: Dec. 7, 1983
[30] Foreign Application Priority Data
Jun. 15, 1983 [JP] Japan .............................. 58-91989[U]
Aug. 30, 1983 [JP] Japan ............................ 58-133097[U]
[51] Int. Cl.⁴ ........................ A63H 31/08; F16H 5/06; F03G 1/00
[52] U.S. Cl. .................................. 446/464; 185/39; 185/DIG. 1; 74/337.5
[58] Field of Search .................... 185/37, 39, DIG. 1; 74/337.5; 446/457, 461, 462, 463, 464

[56] References Cited
U.S. PATENT DOCUMENTS

| | | | |
|---|---|---|---|
| 3,216,529 | 11/1965 | Lohr | 185/39 |
| 3,548,672 | 12/1970 | Conrad | 74/337.5 |
| 3,664,207 | 5/1972 | White | 74/337.5 |
| 3,886,802 | 6/1975 | Mason | 74/337.5 |
| 4,290,227 | 9/1981 | Shimamura | 446/457 |
| 4,463,831 | 8/1984 | Wakase | 185/39 |
| 4,496,330 | 1/1985 | Terui | 446/457 |

FOREIGN PATENT DOCUMENTS

| | | | |
|---|---|---|---|
| 129929 | 1/1929 | Switzerland | 185/39 |
| 382566 | 10/1932 | United Kingdom | 185/39 |

Primary Examiner—Alan Cohan
Assistant Examiner—John A. Rivell
Attorney, Agent, or Firm—Huff & Hanson

[57] ABSTRACT

A two-speed action spring drive which automatically changes the gears from very slow to fast moving state is disclosed. In this device the gear meshing with a driving gear group and the gear meshing with a reducing gear group are linked together by a detachable means which can idle these gears when an excessive force acts thereon.

11 Claims, 12 Drawing Figures

TWO-SPEED ACTION SPRING DRIVE

BACKGROUND OF THE INVENTION

The present invention relates to a two-speed action spring drive to be used for driving a moving toy and the like.

A two-speed action spring drive which is automatically changeable from very slow state to fast state has not previously been available for a moving toy such as a toy auto which is powered by the unwinding action of a spring which has been frictionally wound by rubbing the drive wheel against the floor. The reason is the lack of any reliable means to effect a slow rotation of such a spring drive. If a delay mechanism were introduced in such a drive for this purpose, a rotation of the gear by rubbing the wheel against the floor would result in the destruction of the gear.

The present invention has been accomplished with a view to solving this difficulty. According to the present invention, the solution is obtained by using a detachable means which can idle the gears when an excessive force acts thereon and can also link the geared shafts connecting the reducing gear group and the driving gear group.

BRIEF SUMMARY OF THE INVENTION

The primary object of the present invention is to provide a two-speed action spring drive which can automatically change the gears from very slow state to fast moving state.

Another object of the present invention is to provide a two-speed action spring drive which can reliably cause engagement and disengagement of gears.

Still another object of the present invention is to provide a two-speed action spring drive which can arbitrarily set the time ratio between slow state and fast state.

Briefly, the present invention comprehends a two-speed action spring device comprising a second gear mounted on a shaft carrying a first gear; the two gears linked together by a detachable means which can idle said two gears when an excessive force acts thereon; said shaft supported by a bearing hole of a frame and a bearing hole of a partition frame; a stopper to engage one end of two springs provided between said frame and said second gear; and a spring inserted on the shaft between said second gear and said stopper and another spring inserted on the shaft between said frame and said stopper; the tip of said shaft slightly protruding out of said bearing hole of said partition frame being pushed by a cam rotatable via a driving gear group on a spring shaft to overcome the spring force, whereby said first gear or said second gear is released from the driving gear group.

These and other objects, features and benefits of the present invention will become more apparent from an examination of the following detailed account of the invention with reference to the attached drawings.

DETAILED DESCRIPTION OF THE INVENTION

The spring drive of the present invention is constituted in such a fashion that a second gear is mounted on a shaft carrying a first gear; these gears are linked together by a detachable means which can idle said gears when an excessive force acts on them; said shaft is supported by a bearing hole of a frame and a bearing hole of a partition frame; a stopper to engage one end of two springs is provided between said frame and the second gear; a spring is inserted on the shaft between the second gear and the stopper and another spring is inserted on the shaft between said frame and said stopper; and the tip of said shaft slightly protruding out of the bearing hole of said partition frame is pushed by a cam rotatable via the gear group on a spring shaft to overcome the spring force, whereby the first gear or the second gear is released from the driving gear group.

An embodiment of the present invention is described hereinafter with reference to the drawings.

The spring drive according to the present invention consists of a driving gear group, a reducing gear group, means A to link said driving gear group and said reducing gear group, and a means to disengage said driving gear group from said reducing gear group.

Figure 1:
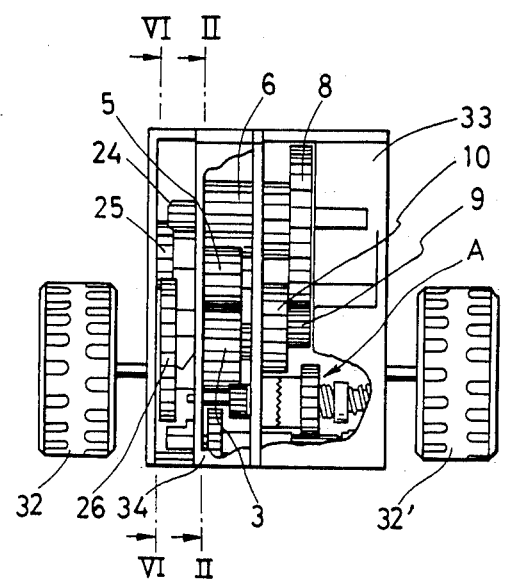
FIG. 1 is a partial fragmentary plan view of a spring drive according to the present invention as employed in a toy car.
Figure 2:
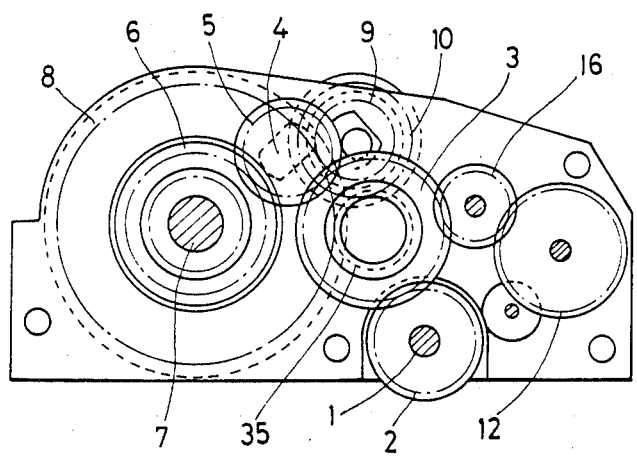
FIG. 2 is a sectional view along the line II—II of the spring drive in FIG. 1.

As shown in FIG. 2, the driving gear group comprises a pinion 2 attached to the wheel shaft (spring windup shaft) 1, a spur gear 3 to mesh with said pinion 2, a windup pinion 5 normally meshing with said spur gear 3 and movably held by a bearing 4, a spring windup shaft 7 carrying an intermediate gear 6 to mesh with said pinion 5, and a large gear 8 integrated to said intermediate gear 6, said large gear 8 normally meshing with a driving pinion 9. During driving, a spur gear 10 integrated to said driving pinion 9 meshes with a pinion 35 integrated to said spur gear 3.

Figure 3:
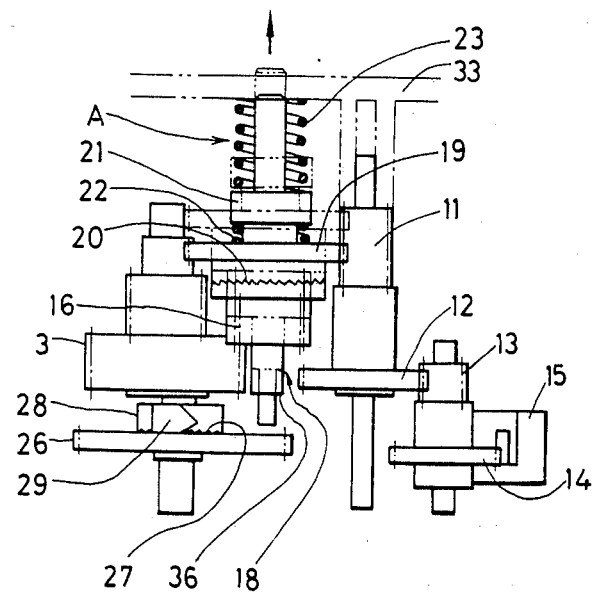
FIG. 3 is a schematic view of the device depicting the engagement and disengagement of the driving gear group and the reducing gear group.

As shown in FIG. 3, the reducing gear group comprises a pinion 11 to mesh with the second gear 19 of the means A to link the driving gear group and the reducing gear group, a spur gear 12 integrated to said pinion 11, a pinion 13 to mesh with said spur gear 12, a large gear 14 integrated to said pinion 13, and a delay element 15 which reduces the gear speed by engaging the teeth of said large gear 14 one after another.

Figure 4:
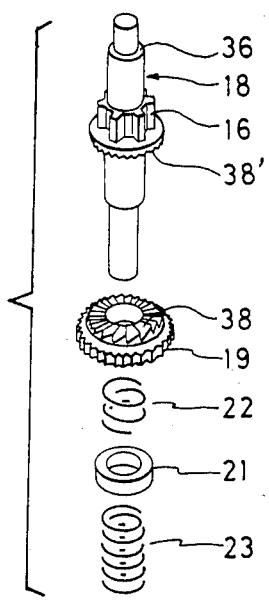
FIG. 4 is a fragmentary oblique view of a shaft equipped with the first gear and the second gear.
Figure 5:
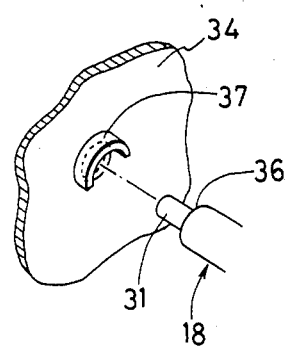
FIG. 5 is an oblique view of an engagement stop provided at the bearing hole.

As illustrated in FIGS. 3 and 4, the means A to link the driving gear group and the reducing gear group is constituted such that a gear 19 linked to the reducing gear group is mounted on a shaft 18 which is integrated to a gear 16 linked to the driving gear group and has a stepped part 36 formed thereon by reducing the diameter of the forward portion; a detachable means 20 which can idle these gears when an excessive force acts on them is provided; a coil spring 22 is inserted on the shaft between a ring stopper 21 fitted to the shaft and said gear 19 linked to the reducing gear group, said spring pressing said gear 19 in the axial direction; a coil spring 23 is inserted on the shaft between said stopper 21 and a frame 33; said shaft 18 is supported by a bearing hole of said frame 33 and a bearing hole of a partition frame 34; and as indicated in FIG. 5, the peripheral wall of said bearing hole is extended to form a semi-circular protrusion which serves as an engagement stop 37.

In this embodiment, said detachable means 20 is constructed such that a groove and a ridge are arranged in a radial direction to oppose each other like 38,38'. Such a construction, however, is not mandatory as any other construction can be used, provided it can idle the gears when an excessive force acts on them.

In this embodiment, a stepped part 36 is formed at the tip of the shaft and an engagement stop is provided at the bearing hole. Such an arrangement is done for the purpose of reliably preventing a gear once disengaged from getting re-engaged before a windup of the spring is completed. However, there is no possibility of the gears meshing again while the cam blades remain at the tip of the shaft and therefore as a matter of fact an undesired meshing of gears can be avoided by designing a short spacing of cam blades. While the gears are rotating fast, they seldom mesh and even if a meshing occurs, no great inconvenience will be caused thereby in a toy equipped with this spring drive. Thus provision of such a stepped part or such an engagement stop is not mandatory.

The stopper 21 can be other than the ring shown in this embodiment. Any other means will do, provided it can engage one end of the coil springs 22 and 23.

Figure 6:
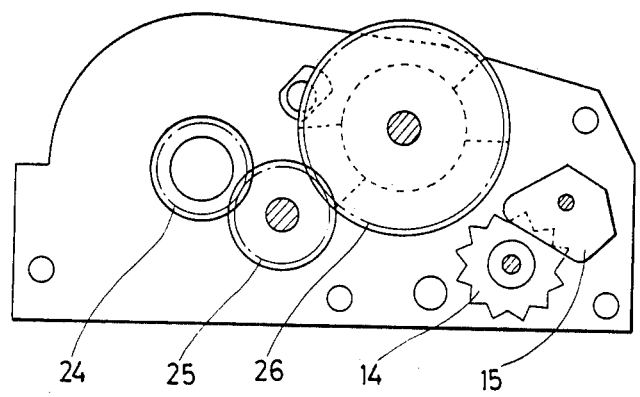
FIG. 6 is a sectional view along the line VI—VI of FIG. 1.
Figure 7:
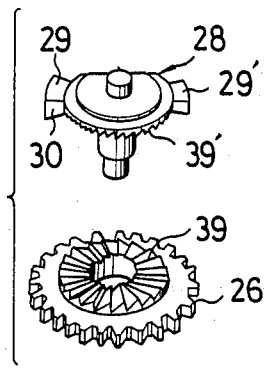
FIG. 7 is a fragmentary oblique view of a cam and a gear to rotate the cam.

As indicated in FIGS. 3, 6 and 7, the means to disengage the driving gear group from the reducing gear group consists of a small gear 24 formed on the spring windup shaft, a pinion 25 to mesh with said small gear 24, a large gear 26 to mesh with said pinion 25, a cam 28 linked via a detachable means 27 to idle the gears when an excessive force acts on them to the backside of said large gear 26, and two blades 29,29' formed at the tip of said cam 28. Said detachable means is the same one as the above-mentioned means 20 in which a groove and a ridge are arranged in a radial direction to oppose each other like 39,39'.

On the backside of the cam blade are formed slanting planes 30,30' extending downward from the top. Thus the shaft tip 31 will be pressed against these slanting planes when the cam rotates. The number of cam tip blades, their spacing and size can be appropriately selected depending on the delay time set.

Figure 8A:
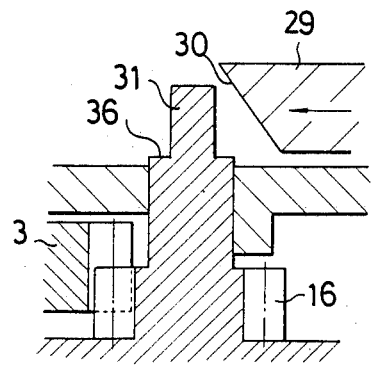
FIGS. 8(A)-(D) are sectional views illustrating the cam mechanism to engage and disengage the driving gear group.
Figure 8B:
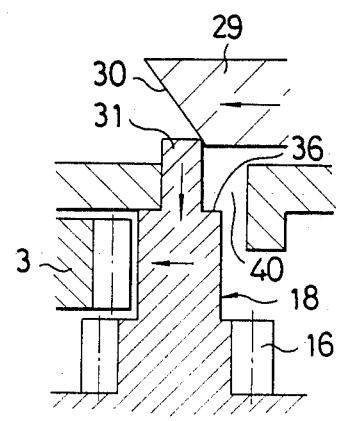
Figure 8C:
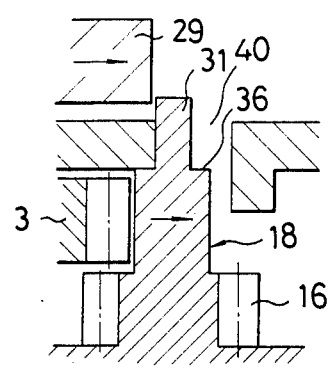
Figure 8D:
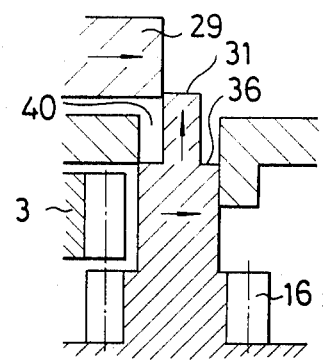
Figure 9:
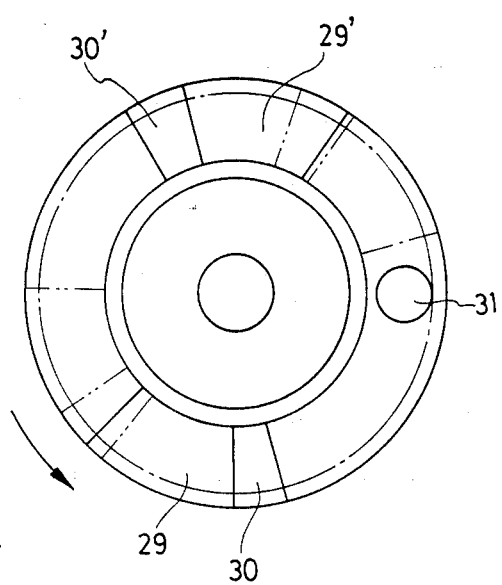
FIG. 9 is a backside view of the cam illustrating how the cam engages the shaft.

With such an arrangement of this embodiment, when the driving wheels 32,32' are rubbed to rotate, the spring can be wound up by said driving gear group. When the spring is released, the toy will be set in forward motion by the unwinding force of the spring. In this state in which the gear 3 of the driving gear group, the first gear 16 and the second gear 19 of the means A to link the driving gear group and the reducing gear group and the pinion 11 of the delay mechanism B are meshing with one another, a load is generated to rotate the gears 16, 19, 11-14 and to move the teeth at the delay element 15; and this load acts to delay the shaft rotation, resulting in a slow motion of the toy. Then as the toy moves progressively the cam 28 rotates together with the gears 24, 25, and 26. When the slanting plane 30 of the cam blade 29 reaches the shaft tip 31, the shaft 18 will be pressed by said plane 30, as shown in FIG. 8A, overcoming the coil spring 23 and, with the gear 3 disengaged from the gear 16, as seen from FIG. 8B, and the load lifted, the shaft rotation is increased, thus causing the toy to run fast. When the cam blade passes, the shaft 18 is pushed up by the spring force, and as indicated in FIG. 8C, the stepped part 36 of the shaft comes to engage the bearing hole 40 in such manner that the shaft tip slightly juts out. Thus there is no possibility of the gear 3 and the gear 16 meshing again before the spring is wound up. When the spring is wound up again, the cam 28 rotates in reverse direction and, as shown in FIG. 8D, the cam blade 29 pushes the shaft tip in the running direction, thereby releasing the stepped part 36 of the shaft from the bearing hole; and the shaft comes to be pushed up by the spring force, thereby allowing the gear 3 and the gear 16 to mesh with each other again.

What is claimed is:

1. A two-speed action spring device comprising a second gear mounted on a shaft carrying a first gear; the two gears linked together by a detachable means which can idle said two gears when an excessive force acts thereon; said shaft supported by a bearing hole of a frame and a bearing hole of a partition frame; a stopper to engage one end of two springs provided between said frame and said second gear; and a spring inserted on the shaft between said second gear and said stopper and another spring inserted on the shaft between said frame and said stopper; the tip of said shaft slightly protruding out of said bearing hole of said partition frame being pushed by a cam rotatable via a driving gear group on a spring shaft to overcome the spring force, whereby said first gear or said second gear is released from the driving gear group.

2. A spring drive of claim 1, wherein said first gear meshes with the driving gear group and said second gear meshes with the reducing gear group.

3. A spring drive of claim 1, wherein said shaft has a stepped part formed at the tip and an engagement stop is provided at the bearing hole supporting the shaft tip.

4. A spring drive of claim 1, wherein said stepped part of said shaft tip is smaller in diameter than the remainder of the shaft.

5. A spring drive of claim 3, wherein the peripheral wall of said bearing hole is extended to form a semi-circular protrusion which is to serve as an engagement stop.

6. A spring drive of claim 1, wherein a blade is formed at the end of the cam and the plane to which the shaft tip is pressed by a rotation of said blade is slanted.

7. A spring drive of claim 6, wherein the cam is linked by a detachable means which can idle said gears when an excessive force acts on the cam top.

8. A spring drive of claim 2, wherein the driving gear group comprises a pinion attached to the spring windup shaft, a spur gear to mesh with said pinion, a windup pinion normally meshing with said spur gear and movably held by a bearing, a spring windup shaft carrying a gear to mesh with said windup pinion, and a driving pinion integrated to said gear to form a large gear and normally meshing with said large gear, said spur gear being linked to the first gear of the means to link the driving gear group and the reducing gear group.

9. A spring drive of claim 2, wherein the reducing gear of the means to link the driving gear group and the reducing gear group, a spur gear integrated to said pinion, a pinion to mesh with said spur gear, a large gear integrated to said pinion, and a delay element which reduces the gear speed by engaging the teeth of said large gear one after another.

10. A spring drive of claim 2, further including means to disengage the driving gear group from the reducing gear group comprises a small gear formed on the spring windup shaft, a pinion to mesh with said small gear, a large gear to mesh with said pinion, a cam linked via a detachable means to idle the gears when an excessive force acts on them to the backside of said large gear, and blades formed at the tip of said cam.

11. A movable toy including a frame, a pair of driving wheels mounted for rotation on said frame and a spring drive connected to said pair of driving wheels, said spring drive comprising a two speed action spring device comprising a second gear mounted on a shaft carrying a first gear; the two gears linked together by a detachable means which can idle said two gears when an excessive force acts thereon; said shaft supported by a bearing hole of a frame and a bearing hole of a partition frame; a stopper to engage one end of two springs provided between said frame and said second gear; and a spring inserted on the shaft between said second gear and said stopper and another spring inserted on the shaft between said frame and said stopper; the tip of said shaft slightly protruding out of said bearing hole of said partition frame being pushed by a cam rotatable via a driving gear group on a spring shaft to overcome the spring force, whereby said first gear or said second gear is released from the driving gear group.

* * * * *